(12) United States Patent
Kudla et al.

(10) Patent No.: US 11,796,642 B2
(45) Date of Patent: Oct. 24, 2023

(54) OVERSAMPLNG AND TRANSMITTER SHOOTING PATTERN FOR LIGHT DETECTION AND RANGING (LIDAR) SYSTEM

(71) Applicant: Infineon Technologies AG, Neubiberg (DE)

(72) Inventors: Wojciech Kudla, Wageningen (NL); Hendrikus Van Lierop, Bj Weert (NL); Jaap Verheggen, Wijchen (NL)

(73) Assignee: Infineon Technologies AG, Neubiberg (DE)

(*) Notice: Subject to any disclaimer, the term of this patent is extended or adjusted under 35 U.S.C. 154(b) by 1247 days.

(21) Appl. No.: 16/364,604

(22) Filed: Mar. 26, 2019

(65) Prior Publication Data

US 2020/0309917 A1   Oct. 1, 2020

(51) Int. Cl.
*G01C 3/08* (2006.01)
*G01S 7/481* (2006.01)
*G01S 17/04* (2020.01)

(52) U.S. Cl.
CPC ............ *G01S 7/4817* (2013.01); *G01S 17/04* (2020.01)

(58) Field of Classification Search
CPC ...... G01S 7/4817; G01S 17/04; G01S 7/4815; G01S 17/10; G01S 17/42; G01S 17/89; G01S 7/484; G01S 7/4863
See application file for complete search history.

(56) References Cited

U.S. PATENT DOCUMENTS

| | | | |
|---|---|---|---|
| 7,923,306 B2 | 4/2011 | Bruland et al. | |
| 8,417,058 B2 | 4/2013 | Tardif | |
| 10,503,265 B2 | 12/2019 | Viswanathan | |
| 2014/0168630 A1* | 6/2014 | Iida .......................... | G01C 3/08 356/3 |
| 2014/0231650 A1 | 8/2014 | Streuber et al. | |
| 2017/0131387 A1 | 5/2017 | Campbell et al. | |
| 2021/0011128 A1 | 1/2021 | Shi et al. | |

FOREIGN PATENT DOCUMENTS

| | | |
|---|---|---|
| CN | 101023510 A | 8/2007 |
| CN | 102413267 A | 4/2012 |
| CN | 108027441 A | 5/2018 |
| CN | 108267746 A | 7/2018 |
| CN | 108431626 A | 8/2018 |
| CN | 108693537 A | 10/2018 |
| CN | 109188451 A | 1/2019 |
| WO | 2017112416 A1 | 6/2017 |

* cited by examiner

*Primary Examiner* — Samantha K Nickerson
(74) *Attorney, Agent, or Firm* — Harrity & Harrity, LLP

(57) ABSTRACT

A Light Detection and Ranging (LIDAR) system includes a LIDAR transmitter and a controller. The LIDAR transmitter, driven by the controller, scans a field of view with laser beams, where each laser beam has a beam width that, when projected into a field of view, coincides with an angle region of the field of view. The LIDAR transmitter transmits a first plurality of laser beams in a first scan, where a first plurality of angle regions covered by the first plurality of laser beams are mutually exclusive of each other. The LIDAR transmitter transmits a second plurality of laser beams in a second scan, where a second plurality of angle regions covered by the second plurality of laser beams are mutually exclusive of each other. Each of the second plurality of angle regions partially overlaps with a different corresponding one of the first plurality of angle regions.

21 Claims, 8 Drawing Sheets

OVERSAMPLNG AND TRANSMITTER SHOOTING PATTERN FOR LIGHT DETECTION AND RANGING (LIDAR) SYSTEM

FIELD

The present disclosure relates generally to devices and methods for Light Detection and Ranging (LIDAR) systems.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (TOF). LIDAR systems form depth measurements and make distance measurements by mapping the distance to objects based on the time-of-flight computations. Thus, the time-of-flight computations can create distance and depth maps, which may be used to generate images.

LIDAR transmitters may fire light as a narrow laser beam at different horizontal positions in a field of view. However, slender objects that are located between two consecutive laser beams may not be detected. Furthermore, two or more objects that are located less than a pixel-distance apart may not be distinguishable from each other, and, consequently, may be detected as a single object.

Therefore, an improved device having an improved way of detecting objects in a field of view may be desirable.

SUMMARY

Embodiments provide object scanning systems and methods for operating the same, and, more particularly, to implementing overlapped scanning techniques.

According to one or more embodiments, a Light Detection and Ranging (LIDAR) system includes a LIDAR transmitter and a controller. The LIDAR transmitter is configured to scan a field of view with laser beams, where each laser beam has a beam width that, when projected into the field of view, coincides with an angle region of the field of view in a horizontal direction. The controller is configured to initiate a plurality of scans of the field of the view with the LIDAR transmitter using an overlapped scanning technique. The LIDAR transmitter is further configured to transmit a first plurality of laser beams according to a first transmission interval in a first scan that moves horizontally across the field of view, where a first plurality of angle regions covered by the first plurality of laser beams are mutually exclusive of each other. The LIDAR transmitter is further configured to transmit a second plurality of laser beams according to a second transmission interval in a second scan that moves horizontally across the field of view, where a second plurality of angle regions covered by the second plurality of laser beams are mutually exclusive of each other. Each of the second plurality of angle regions partially overlaps with a different corresponding one of the first plurality of angle regions by a first predetermined amount.

According to one or more embodiments, a LIDAR system includes a LIDAR transmitter, a controller, and a signal processing circuit. The LIDAR transmitter is configured to scan a field of view with laser beams, where each laser beam has a beam width that, when projected into the field of view, coincides with an angle region of the field of view in a horizontal direction. The controller is configured to control the LIDAR transmitter to scan the field of the view using an overlapped scanning technique. The LIDAR transmitter is further configured to transmit a first plurality of laser beams in a first scan that moves horizontally across the field of view, the first plurality of laser beams being transmitted at a first plurality of transmission directions such that a first plurality of angle regions covered by the first plurality of laser beams are mutually exclusive of each other. The signal processing circuit is configured to detect at least one object based on the first plurality of laser beams, and identify an object transmission direction from the first plurality of transmission directions that corresponds to a position of the at least one object, where the object transmission direction further corresponds to a target angle region of the first plurality of angle regions. The LIDAR transmitter is further configured to transmit a first overlapped laser beam that partially overlaps with the target angle region.

According to one or more embodiments, a method of scanning a field of view implemented by a LIDAR system is provided. The method includes scanning a field of view with laser beams, wherein each laser beam has a beam width that, when projected into the field of view, coincides with an angle region of the field of view in a horizontal direction. The scanning includes: transmitting a first plurality of laser beams according to a first transmission interval in a first scan that moves horizontally across the field of view, where a first plurality of angle regions covered by the first plurality of laser beams are mutually exclusive of each other; and transmitting a second plurality of laser beams according to a second transmission interval in a second scan that moves horizontally across the field of view, where a second plurality of angle regions covered by the second plurality of laser beams are mutually exclusive of each other, where each of the second plurality of angle regions partially overlaps with a different corresponding one of the first plurality of angle regions by a first predetermined amount.

According to one or more embodiments, an object scanning system includes an object sensor configured to detect a position of an object; a LIDAR transmitter configured to scan a field of view with laser beams, where each laser beam has a beam width that, when projected into the field of view, coincides with an angle region of the field of view in a horizontal direction; and a controller configured to determine a transmission direction that coincides with the detected position of the object, control the LIDAR transmitter to transmit a first laser beam at the transmission direction such that a first angle region covered by the first laser beam coincides with the detected position of the object, and control the LIDAR transmitter to transmit a second laser beam at a first further transmission direction such that a second angle region covered by the second laser beam overlaps with a first portion of the first angle region.

According to one or more embodiments, an object scanning system includes an object sensor configured to detect a position of an object; a LIDAR transmitter configured to scan a field of view with laser beams, wherein each laser beam has a beam width that, when projected into the field of view, coincides with an angle region of the field of view in a horizontal direction; and a controller configured to: determine a transmission direction that coincides with the detected position of the object; based on the determined transmission direction, control the LIDAR transmitter to transmit a first laser beam such that a first angle region covered by the first laser beam coincides with the detected position of the object; and based on the determined transmission direction, control the LIDAR transmitter to transmit a second laser beam such that a second angle region covered by the second laser beam partially overlaps with the first angle region.

BRIEF DESCRIPTION OF THE DRAWINGS

Embodiments are described herein making reference to the appended drawings.

DETAILED DESCRIPTION

Figure 1A:
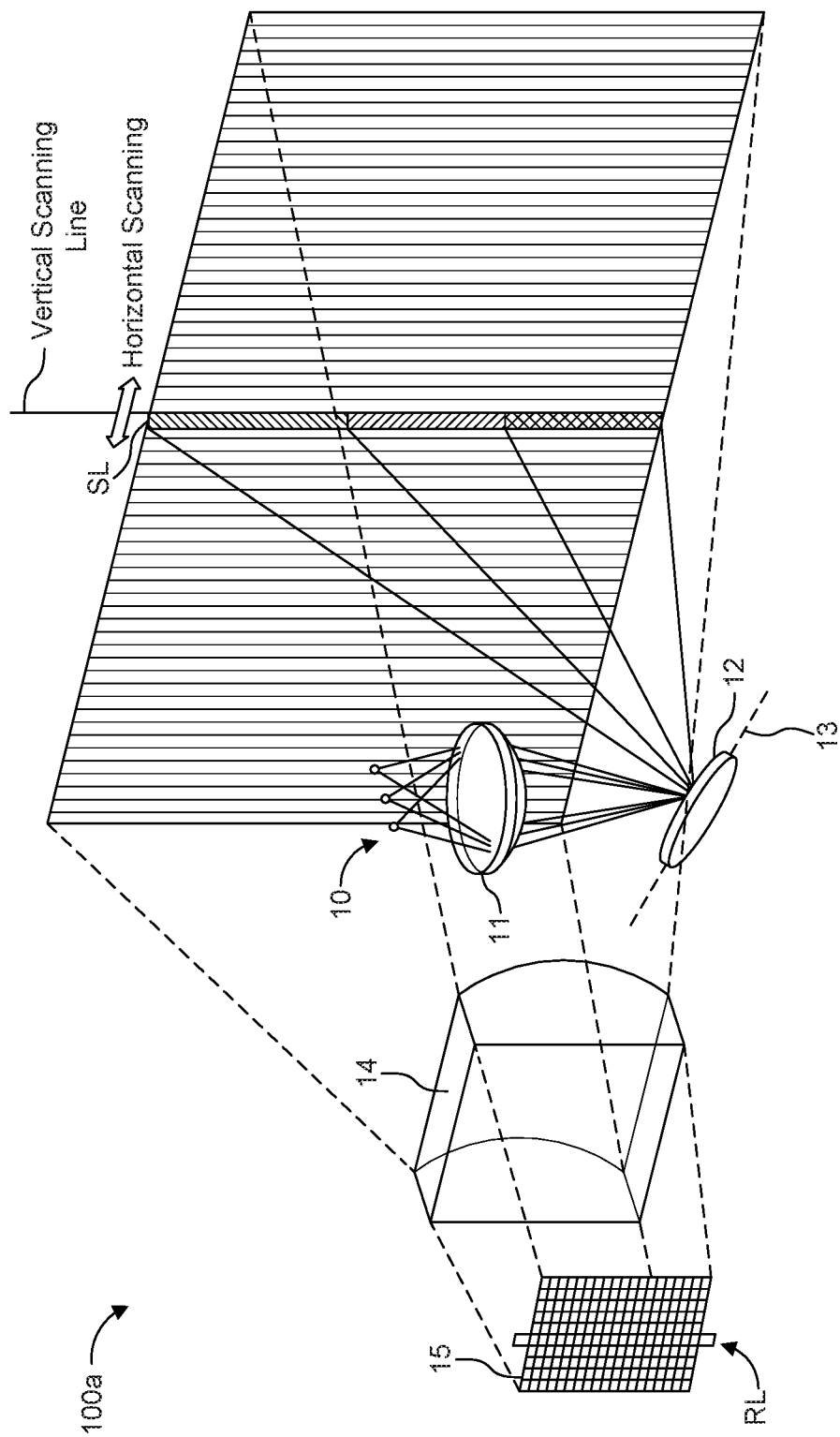
FIG. 1A is a schematic diagram of a horizontal LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. In particular, LIDAR is a direct Time-of-Flight (TOF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a one-dimensional (1D) array that consists of multiple rows of photodetectors (pixels) arranged in a single column or a two-dimensional (2D) array that consists of multiple rows and columns of photodetectors arranged in a grid-like arrangement. Each pixel row or group of adjacent pixel rows may be readout as a measurement signal in the form of raw analog data. Each measurement signal may include data from a single pixel column or from two or more pixel column corresponding to the selected pixel row or rows.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, until a time the reflected light pulse is received at the receiver (i.e., at the pixel array), corresponding to a stop signal. The "time-of-flight" of the light pulse is then translated into a distance. In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/stop signals with an appropriate algorithm.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1A is a schematic diagram of a LIDAR scanning system 100a in accordance with one or more embodiments. The LIDAR scanning system 100a is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15 but may alternatively be a 1D photodetector array. The receiver may further include receiver circuitry, such as data acquisition/readout circuitry and data processing circuitry, as will be further described according to FIG. 2. The LIDAR scanning system 100a uses pulsed modulation, similar to the LIDAR technique described above, to measure a distance to a 3D object by measuring the absolute time a light pulse takes to travel from a source into the 3D scene and back, after reflection.

Turning back to FIG. 1A, the photodetector array 15, whether it be a 2D array or a 1D array, is arranged in such a manner that an intended field of view is mapped vertically on the vertical extension of the photodetector array 15. A received light beam will hit only a specific row or group or rows of the detector array depending on the vertical angle of the received light beam. The intended field of view may be further mapped horizontally on the horizontal extension of a 2D photodetector array.

In this example, the illumination unit 10 includes three light sources (e.g., laser diodes or light emitting diodes) that are linearly aligned in single bar formation and are configured to transmit light used for scanning the field of view for objects. The light sources may be fired as a single unit (i.e., simultaneously as a single laser diode) or at different timings as separate laser diodes.

The light emitted by the light sources is typically infrared light although light with another wavelength might also be used. As can be seen in the embodiment of FIG. 1A, the shape of the light emitted by the light sources is spread in a direction perpendicular to the transmission direction to form a light beam with an oblong shape perpendicular to a transmission direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a transmission direction of the laser beams. As can be seen from FIG. 1A, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

In addition, while three laser sources are shown, it will be appreciated that the number of laser sources are not limited thereto. For example the vertical scanning line SL may be generated by a single laser source, two laser sources or more than three laser sources.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two consecutive scans are used for each scanning period. Multiple scans may be used to generate distance and depth maps, as well as 3D images by a processing unit. The horizontal resolution of the depth maps and images depends on the size of the incremental steps in rotation angle of the MEMS mirror 12 taken between scans.

Each laser beam has a divergence in the horizontal direction. Specifically, the width of each laser beam has a Gaussian shape, where a laser beam has a peak intensity at its center and the intensity drops down on the sides. Thus, while each laser beam extends lengthwise in the vertical direction, its width also covers a discrete range of angles (i.e., an angle region) in the horizontal direction. Therefore, an angle region, as used herein, refers to a region that includes a plurality of discrete angles. As the transmitter fires laser beams into the field of view at different positions (i.e., based on the position of the MEMS mirror 12), different angle regions in the horizontal direction of the field of view are sampled.

When it is said that two angle regions overlap, the overlapping angle regions may correspond to beams fired by a same laser diode at different times. "A same laser diode" may refer to multiple light sources that are configured to fire light simultaneously to generate a laser beam (i.e., a full or partial scanning line) having a width that fully occupies the angle region throughout the lengthwise extension of the beam produced by all light sources. Alternatively, "a same laser diode" may refer to a single light source that is configured to generate a laser beam (i.e., a partial scanning line) having a width that fully occupies the angle region throughout the lengthwise extension of the beam produced by only that light source. Thus, a plurality of beams are those generated by a same laser diode and the beam width of each laser beam fully occupies the angle region of the field of view throughout a lengthwise extension of the laser beam.

Moreover, the transmitter is configured to employ a overlapped scanning technique to achieve oversampling of the field of view. According to the overlapped scanning technique, the transmitter is configured to transmit a first plurality of laser beams, via synchronization of the illumination unit 10 with the scanning position of the MEMS mirror 12, at a first plurality of transmission directions for a first scan that moves horizontally in a first horizontal direction (e.g., from a first edge of the field of view to a second edge of the field of view). The first plurality of transmission directions are such that the angle regions covered by the first plurality of laser beams are mutually exclusive of each other (i.e., they do not overlap). Thus, the first plurality of laser beams are each fired at different angle regions with respect to each other to sample different horizontal regions of the field of view.

The transmitter is configured to transmit a second plurality of laser beams, via synchronization of the illumination unit 10 with the scanning position of the MEMS mirror 12, at a second plurality of transmission directions for a second scan that moves horizontally (e.g., edge-to-edge) across the field of view. The second plurality of transmission directions are such that the angle regions covered by the second plurality of laser beams are mutually exclusive of each other (i.e., they do not overlap).

However, each of the second plurality of transmission directions is selected by a system controller (e.g., system controller 23 in FIG. 2) such that an angle region of a corresponding one of the second plurality of laser beams partially overlaps with an angle region one of the first plurality of laser beams. In other words, each of the second plurality of laser beams corresponds to a different one of the first plurality of laser beams such that their angle regions partially overlap in the horizontal direction.

The second plurality of laser beams may be transmitted in a same scanning period or different scanning period with respect to a scanning period of the first plurality of laser beams.

With respect to a same scanning period configuration, the first plurality of laser beams may be transmitted during a first scan of a first scanning period, the first scan being from the first edge of the field of view to the second edge of the field of view. While the second plurality of laser beams may be transmitted during a second scan of the first scanning period, the second scan being in the horizontal direction opposite to the movement of the first scan (e.g., from the second edge of the field of view to the first edge of the field of view). Thus, the first and the second scans are consecutive scans with no intervening scans in-between.

Alternatively, with respect to a different scanning period configuration, the first plurality of laser beams may be transmitted during a first scan of a first scanning period, the first scan being from the first edge of the field of view to the second edge of the field of view. While the second plurality of laser beams may be transmitted during a second scan of a second scanning period, the second scan being from either from the first edge of the field of view to the second edge of the field of view or from the second edge of the field of view to the first edge of the field of view. Thus, the first and the second scans are not consecutive scans such that there is at least one intervening scan in-between.

In addition, the transmitter is configured to transmit a third plurality of laser beams, via synchronization of the illumination unit 10 with the scanning position of the MEMS mirror 12, at a third plurality of transmission directions for a third scan that moves horizontally, edge-to-edge, across the field of view. The third plurality of transmission directions are such that the angle regions covered by the third plurality of laser beams are mutually exclusive of each other (i.e., they do not overlap).

However, each of the third plurality of transmission directions is selected by the system controller (e.g., by the system controller 23 in FIG. 2) such that an angle region of a corresponding one of the third plurality of laser beams partially overlaps with an angle region of one of the first plurality of laser beams or partially overlaps with an angle region one of the second plurality of laser beams. In other words, each of the third plurality of laser beams corresponds to a different one of the first plurality of laser beams such that their angle regions partially overlap, or each of the third plurality of laser beams corresponds to a different one of the second plurality of laser beams such that their angle regions partially overlap.

In some configurations, it is possible that an angle region of a corresponding one of the third plurality of laser beams partially overlaps in the horizontal direction with an angle region of one of the first plurality of laser beams and partially overlaps in the horizontal direction with an angle region one of the second plurality of laser beams.

In addition, the third plurality of laser beams may be transmitted in a same scanning period with respect to a scanning period of the first plurality of laser beams, or in a same scanning period with respect to a scanning period of the second plurality of laser beams, although in different scans of the same scanning period. Alternatively, the third plurality of laser beams may be transmitted in a different scanning period with respect to both a scanning period of the first plurality of laser beams and a scanning period of the second plurality of laser beams.

A degree of overlap for two overlapping angle regions is configurable. Thus, the degree of oversampling is configurable such that improved object detection and image sharpness is possible and configurable. However, the higher the degree of overlap, the lower the frame rate will be as more scans will be required to sample the entire field of view.

For example, the degree of overlap may be 50%. In the scenario in which the first, the second, and the third scans occur sequentially, the beams in the first and the second scans may overlap by 50%, and the beams in the second and the third scans may overlap by 50%, with no overlap between beams of the first and the third scans.

In another example, the degree of overlap may be 25% (i.e., less than 50%). In the scenario in which the first, the second, and the third scans occur sequentially, the beams in the first and the second scans may overlap by 25%, and the beams in the second and the third scans may overlap by 25%, with no overlap between beams of the first and the third scans.

In another example, the degree of overlap may be 75% (i.e., greater than 50%). In the scenario in which the first, the second, and the third scans occur sequentially, the beams in the first and the second scans may overlap by 75%, and the beams in the second and the third scans may overlap by 75%, with a 50% overlap between respective beams of the first and the third scans. Furthermore, if a fourth plurality of beams in a fourth scan is considered, they may have a 75% overlap with the beams of the third scan and a 25% overlap with the beams of the first scan.

While the transmission mirror is described in the context of a MEMS mirror, it will be appreciated that other 1D mirrors or even 2D mirrors having two orthogonal rotation axes can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

Upon impinging one or more objects, the transmitted bar of vertical light is reflected by backscattering back towards the LIDAR scanning system 100a as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. The electrical measurement signals may be used for generating a 3D map of the environment and/or other object data based on the reflected light (e.g., via TOF calculations and processing).

The receiving line RL is shown as a vertical column of light that extends along one of the pixel columns in a lengthwise direction of the pixel column. The receiving line has three vertical regions that correspond to the vertical regions of the vertical scanning line SL shown in FIG. 1A. As the vertical scanning line SL moves horizontally across the field of view, the vertical column of light RL incident on the 2D photodetector array 15 also moves horizontally across the 2D photodetector array 15. The reflected light beam RL moves from a first edge of the photodetector detector array 15 to a second edge of the photodetector detector array 15 as the receiving direction of the reflected light beam RL changes. The receiving direction of the reflected light beam RL corresponds to a transmission direction of the scanning line SL. Thus, LIDAR transmitters may fire light as a narrow laser pulse at different positions in a field of view, where each firing position corresponds to a pixel column of the photodetector array 15.

In a system that uses a 1D photodetector array instead of a 2D photodetector array, each light beam (i.e., each receiving line RL) is projected onto the column of the detector array.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a two-dimensional (2D) APD array that comprises an array of APD pixels. As noted above, the photodetector array 15 may be a 1D array that includes a single column of photodiodes. The activation of the photodiodes may be synchronized with light pulses emitted by the illumination unit 10.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a microcontroller triggers a laser pulse from each of the light sources of the illumination unit 10 and also starts a timer in a Time-to-Digital Converter (TDC) Integrated Circuit (IC). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to stop the timer. The TDC uses a clock frequency to calibrate each measurement. The TDC sends the serial data of the differential time between the start and stop digital signals to the microcontroller, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

The signal processing chain of the receiver may also include an ADC for each photodiode or for a group of photodiodes. The ADC is configured to convert the analog electrical signals from the photodiodes or group of photodiodes into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a stop signal (i.e., corresponding to a timing of receiving an analog electrical signal at an ADC) with an appropriate algorithm.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a vertical column of light that may, for example, have the width of one photodetector pixel and a length that spans vertically at least partially along a pixel column of the photodetector array 15 in a lengthwise direction. That is, all photodetector pixels in a pixel column or a portion of the photodetector pixels of the pixel column may receive the bar of light. For example, in one instance, all light sources of the illumination unit 10 may be used to generate the scanning line SL/receiving line RL. In this case, the receiving line RL may extend along a full pixel column in the lengthwise direction. In another instance, only a subset of the light sources may be used to generate the scanning line SL/receiving line RL. In this case, the receiving line may extend along only a portion of the pixel column in the lengthwise direction.

In some instances, two or more pixel columns may receive light from a same bar of light. For example, two pixel columns may receive light when a portion of the received bar of light impinges on an area between two photodetector pixels. In this case, two pixel columns may be partially illuminated by a single bar of light in the width direction.

On the other hand, if a partial vertical scanning line SL is generated by the illumination unit 10, as described above, then only a partial pixel column of the photodetector array 15 may be illuminated in a lengthwise direction.

The photodetector array 15 is configured to generate measurement signals (electrical signals) used for generating a 3D map of the environment based on the reflected light (e.g., via TOF calculations and processing). For example, as noted above, the photodetector array 15 may be a 2D array of photodiodes or other light detection component capable of detecting and measuring light, and generating electrical signals therefrom.

While not shown, the LIDAR scanning system 100a may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15. For example, the DMD would first receive the reflected light pulse from the primary optics, and deflect the received reflected light through the secondary optics (e.g., a lens, a total internal reflection (TIR) prism, or a beam splitter) onto the photodetector array 15. In this case, the photodetector array 15 would still receive a vertical column of light, as described above.

Figure 1B:
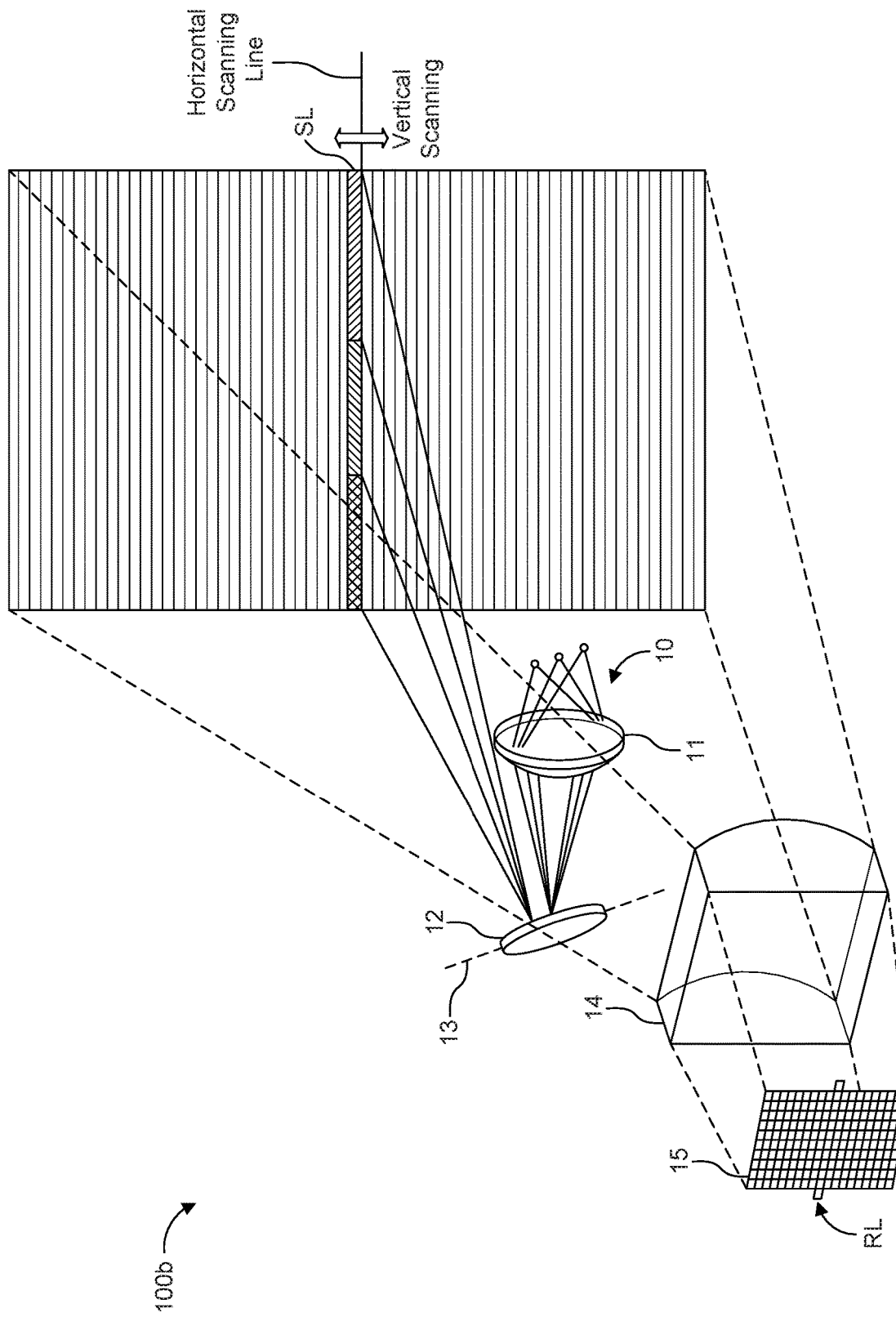
FIG. 1B is a schematic diagram of a vertical LIDAR scanning system in accordance with one or more embodiments.

FIG. 1B is a schematic diagram of a vertical LIDAR scanning system 100b in accordance with one or more embodiments. In particular, the LIDAR scanning system 100b is similar to the LIDAR scanning system 100a, with the exception that the scanning direction is rotated 90° such that the scanning line SL and the receiving line RL move in the vertical direction (i.e., from top to bottom or from bottom to top). As such, the scanning line is a horizontal scanning line SL that is projected into the field of view that moves vertically across the field of view as the transmission mirror oscillates about the single scanning axis. Furthermore, as the horizontal scanning line SL moves vertically across the field of view, the horizontal column of light RL incident on the 2D photodetector array 15 also moves vertically across the 2D photodetector array 15.

Furthermore, each transmission position of the transmitter may correspond to a pixel row of the photodetector array 15. For example, in this setup, reflective pulses arrive at the photodetector array 15 as a horizontal row of light that may, for example, have the width of one photodetector pixel and a length that spans horizontally at least partially along a pixel row of the photodetector array 15 in a lengthwise direction. That is, all photodetector pixels in a pixel row or a portion of the photodetector pixels of the pixel row may receive the bar of light. For example, in one instance, all light sources of the illumination unit 10 may be used to generate the scanning line SL/receiving line RL. In this case, the receiving line RL may extend along a full pixel row in the lengthwise direction. In another instance, only a subset of the light sources may be used to generate the scanning line SL/receiving line RL. In this case, the receiving line may extend along only a portion of the pixel row in the lengthwise direction.

In some instances, two or more pixel rows may receive light from a same bar of light. For example, two pixel rows may receive light when a portion of the received bar of light impinges on an area between two photodetector pixels. In this case, two pixel rows may be partially illuminated by a single bar of light in the width direction.

On the other hand, if a partial horizontal scanning line SL is generated by the illumination unit 10, as described above, then only a partial pixel row of the photodetector array 15 may be illuminated in a lengthwise direction.

Each laser beam has a divergence in the vertical direction. Specifically, the width of each laser beam has a Gaussian shape, where a laser beam has a peak intensity at its center and the intensity drops down on the sides. Thus, while each laser beam extends lengthwise in the horizontal direction, its width also covers a discrete range of angles (i.e., an angle region) in the vertical direction. Therefore, an angle region, as used herein, refers to a region that includes a plurality of discrete angles. As the transmitter fires laser beams into the field of view at different positions (i.e., based on the position of the MEMS mirror 12), different angle regions in the vertical direction of the field of view are sampled.

When it is said that two angle regions overlap, the overlapping angle regions may correspond to beams fired by a same laser diode at different times. "A same laser diode" may refer to multiple light sources that are configured to fire light simultaneously to generate a laser beam (i.e., a full or partial scanning line) having a width that fully occupies the angle region throughout the lengthwise extension of the beam produced by all light sources. Alternatively, "a same laser diode" may refer to a single light source that is configured to generate a laser beam (i.e., a partial scanning line) having a width that fully occupies the angle region throughout the lengthwise extension of the beam produced by only that light source. Thus, a plurality of beams are those generated by a same laser diode and the beam width of each laser beam fully occupies the angle region of the field of view throughout a lengthwise extension of the laser beam.

Moreover, the transmitter is configured to employ a overlapped scanning technique to achieve oversampling of the field of view. According to the overlapped scanning technique, the transmitter is configured to transmit a first plurality of laser beams, via synchronization of the illumination unit 10 with the scanning position of the MEMS mirror 12, at a first plurality of transmission directions for a first scan that moves vertically in a first vertical direction (e.g., from a first edge of the field of view to a second edge of the field of view). The first plurality of transmission directions are such that the angle regions covered by the first plurality of laser beams are mutually exclusive of each other (i.e., they do not overlap). Thus, the first plurality of laser beams are each fired at different angle regions with respect to each other to sample different vertical regions of the field of view.

The transmitter is configured to transmit a second plurality of laser beams, via synchronization of the illumination unit 10 with the scanning position of the MEMS mirror 12, at a second plurality of transmission directions for a second scan that moves vertically (e.g., edge-to-edge) across the field of view. The second plurality of transmission directions are such that the angle regions covered by the second plurality of laser beams are mutually exclusive of each other (i.e., they do not overlap).

However, each of the second plurality of transmission directions is selected by a system controller (e.g., system controller 23 in FIG. 2) such that an angle region of a corresponding one of the second plurality of laser beams partially overlaps with an angle region one of the first plurality of laser beams. In other words, each of the second plurality of laser beams corresponds to a different one of the first plurality of laser beams such that their angle regions partially overlap in the vertical direction.

The second plurality of laser beams may be transmitted in a same scanning period or different scanning period with respect to a scanning period of the first plurality of laser beams.

With respect to a same scanning period configuration, the first plurality of laser beams may be transmitted during a first scan of a first scanning period, the first scan being from the first edge of the field of view to the second edge of the field of view. While the second plurality of laser beams may be transmitted during a second scan of the first scanning period, the second scan being in the vertical direction opposite to the movement of the first scan (e.g., from the second edge of the field of view to the first edge of the field of view). Thus, the first and the second scans are consecutive scans with no intervening scans in-between.

Alternatively, with respect to a different scanning period configuration, the first plurality of laser beams may be transmitted during a first scan of a first scanning period, the first scan being from the first edge of the field of view to the second edge of the field of view. While the second plurality of laser beams may be transmitted during a second scan of a second scanning period, the second scan being from either from the first edge of the field of view to the second edge of the field of view or from the second edge of the field of view to the first edge of the field of view. Thus, the first and the second scans are not consecutive scans such that there is at least one intervening scan in-between.

In addition, the transmitter is configured to transmit a third plurality of laser beams, via synchronization of the illumination unit 10 with the scanning position of the MEMS mirror 12, at a third plurality of transmission directions for a third scan that moves vertically, edge-to-edge, across the field of view. The third plurality of transmission directions are such that the angle regions covered by the third plurality of laser beams are mutually exclusive of each other (i.e., they do not overlap).

However, each of the third plurality of transmission directions is selected by the system controller (e.g., by the system controller 23 in FIG. 2) such that an angle region of a corresponding one of the third plurality of laser beams partially overlaps in the vertical direction with an angle region of one of the first plurality of laser beams or partially overlaps in the vertical direction with an angle region one of the second plurality of laser beams. In other words, each of the third plurality of laser beams corresponds to a different one of the first plurality of laser beams such that their angle regions partially overlap, or each of the third plurality of laser beams corresponds to a different one of the second plurality of laser beams such that their angle regions partially overlap.

In some configurations, it is possible that an angle region of a corresponding one of the third plurality of laser beams partially overlaps with an angle region of one of the first plurality of laser beams and partially overlaps with an angle region one of the second plurality of laser beams.

In addition, the third plurality of laser beams may be transmitted in a same scanning period with respect to a scanning period of the first plurality of laser beams, or in a same scanning period with respect to a scanning period of the second plurality of laser beams, although in different scans of the same scanning period. Alternatively, the third plurality of laser beams may be transmitted in a different scanning period with respect to both a scanning period of the first plurality of laser beams and a scanning period of the second plurality of laser beams.

A degree of overlap for two overlapping angle regions is configurable. Thus, the degree of oversampling is configurable such that improved object detection and image sharpness is possible and configurable. However, the higher the degree of overlap, the lower the frame rate will be as more scans will be required to sample the entire field of view.

For example, the degree of overlap may be 50%. In the scenario in which the first, the second, and the third scans occur sequentially, the beams in the first and the second scans may overlap by 50%, and the beams in the second and the third scans may overlap by 50%, with no overlap between beams of the first and the third scans.

In another example, the degree of overlap may be 25% (i.e., less than 50%). In the scenario in which the first, the second, and the third scans occur sequentially, the beams in the first and the second scans may overlap by 25%, and the beams in the second and the third scans may overlap by 25%, with no overlap between beams of the first and the third scans.

In another example, the degree of overlap may be 75% (i.e., greater than 50%). In the scenario in which the first, the second, and the third scans occur sequentially, the beams in the first and the second scans may overlap by 75%, and the beams in the second and the third scans may overlap by 75%, with a 50% overlap between respective beams of the first and the third scans. Furthermore, if a fourth plurality of beams in a fourth scan is considered, they may have a 75% overlap with the beams of the third scan and a 25% overlap with the beams of the first scan.

It will be appreciated that, while some embodiments are described with reference to the horizontal LIDAR scanning system 100a, any embodiment can be similarly applied to both the horizontal LIDAR scanning system 100a and to the vertical LIDAR scanning system 100b. In this sense, the concept of overlapped angle regions in the horizontal direction in reference to scanning system 100a is interchangeable with the concept of overlapped angle regions in the vertical direction in reference to scanning system 100b, and vice versa.

Figure 2:
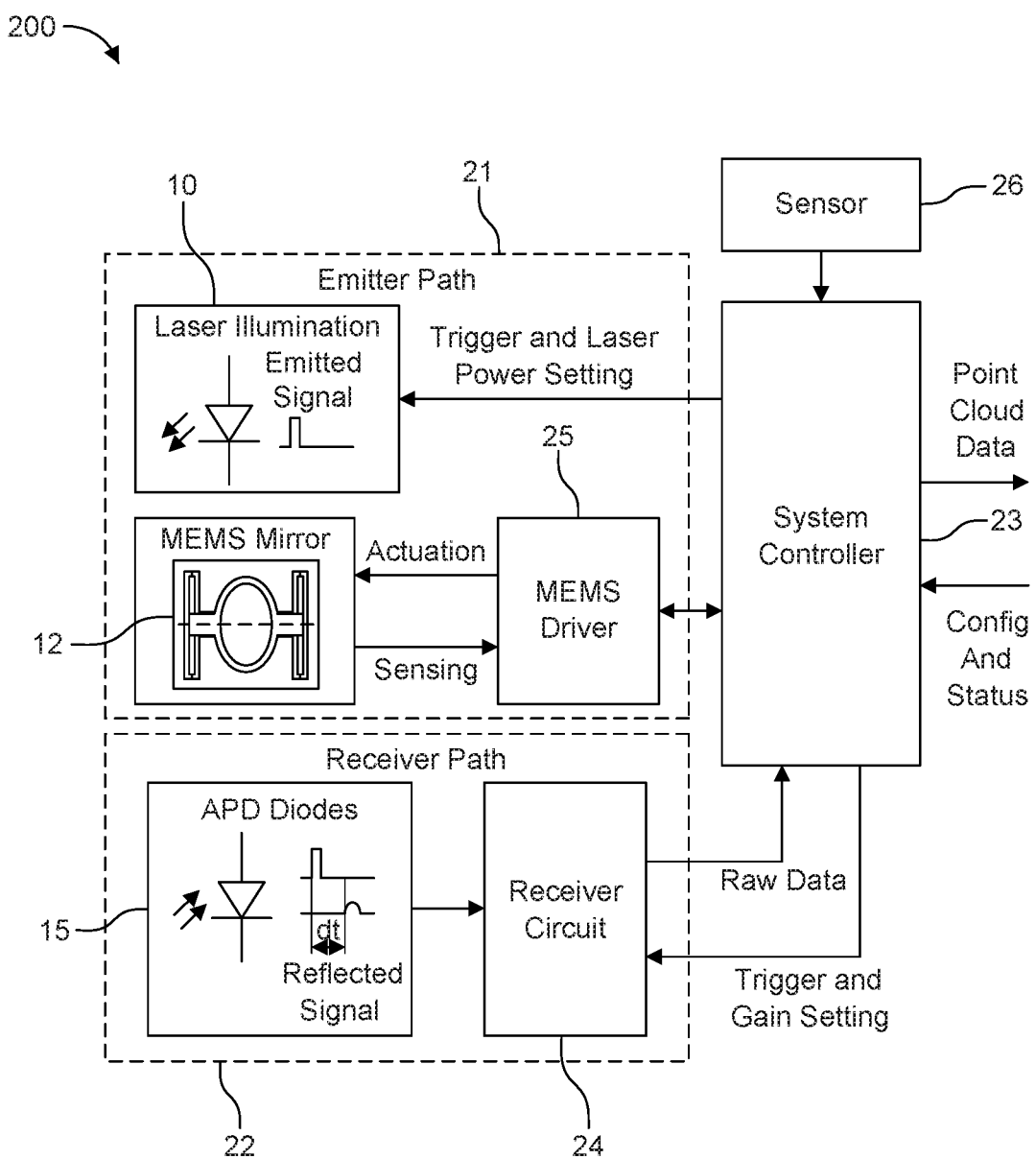
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators, TDCs, ADCs, and digital signal processors (DSPs)) of a signal processing chain for processing data, as well as control circuitry, such as a microcontroller, that is configured to generate control signals. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

Specifically, the system controller 23 is configured to control the illumination unit 10 and the MEMS mirror 12 to implement an overlapped scanning technique. The firing of laser beams from the illumination unit 10 is coordinated with an rotational (angular) position of the MEMS mirror 12 to transmit laser beams into the field of view based on, for example, a desired timing interval and/or a desired transmission direction.

As noted above, each laser beam covers an angle region of the field of view. The system controller 23 determines a discrete mirror position for each laser beam transmission and synchronizes the laser beam transmission with that discrete mirror position. Thus, each discrete mirror position corresponds to a discrete transmission direction and, consequently, an angle region that is covered by the width of the transmitted laser beam. Furthermore, each transmission position of the transmitter may correspond to a pixel column of the photodetector array 15.

The system controller 23 may further determine a desired transmission direction based on a estimated position of a detected object. The position information may be received by one or more object sensors coupled to the system controller 23, including the LIDAR sensor itself or a different type of object sensor, including, but not limited to, a radar sensor or a camera sensor.

The receiver unit 22 includes the photodetector array 15 as well as a receiver circuit 24 that includes an analog readout circuit. As will be described in more detail below, each row of the photodetector array 15 may be selectively coupled and decoupled by an analog multiplexer to the receiver circuit 24. A pixel, a row, or a column that is coupled to the receiver circuit 24 may be referred to as active, while a pixel, a row, or a column that is not coupled to the receiver circuit 24 may be referred to as inactive.

The analog readout circuit includes N analog output channels (e.g., 32 channels) configured to read out measurement signals received from a selected pixel of a coupled row of the photodetector array 15. Furthermore, more than one pixel from a coupled row may be selected, multiple rows may simultaneously be coupled to an output channel, and one or more pixels may be selected from each coupled row.

Thus, the receiver circuit 24 may receive the analog electrical signals from the photodetectors of the photodetector array 15 and transmit the electrical signals as raw analog data to an analog-to-digital converter (ADC). Prior to the ADC receiving the electrical signals, the electrical signals may pass through an amplifier (e.g., a transimpedance amplifier (TIA)) that converts the electrical signals from, for example, current into voltage. The ADC is configured to convert the raw analog data into raw digital data for further processing. The amplifier and/or the ADC may be incorporated in the system controller 23 or the receiver circuit 24, or may be interposed between the receiver circuit 24 and the system controller 23 as separate circuits.

The receiver circuit 24 may also receive trigger control signals from the system controller 23 that triggers an activation of one or more photodetectors. The receiver circuit 24 may also receive gain setting control signals for controlling the gain of one or more photodetectors.

The system controller 23 includes signal processing circuitry that receives the raw digital data as well as serial data of a differential time between start and stop digital signals generated by an ADC, and uses the received data to calculate time-of-flight information for each field position within the field of view, to generate object data (e.g., point cloud data), and to generate a 3D point cloud.

Specifically, the signal processing circuitry of the system controller 23 may be configured to detect an object based on the electrical signals generated by the photodetectors of the photodetector array 15. Based on the detection, the signal processing circuitry may determine an estimated position of the object in the field of view, a direction to the object, and/or an angular position of the mirror 12 that correspond to the position of or direction to the object. The system controller 23 may control a transmission of one or more laser beams based on the estimated position of the object while implementing the overlapped scanning technique described herein.

Figure 3A:
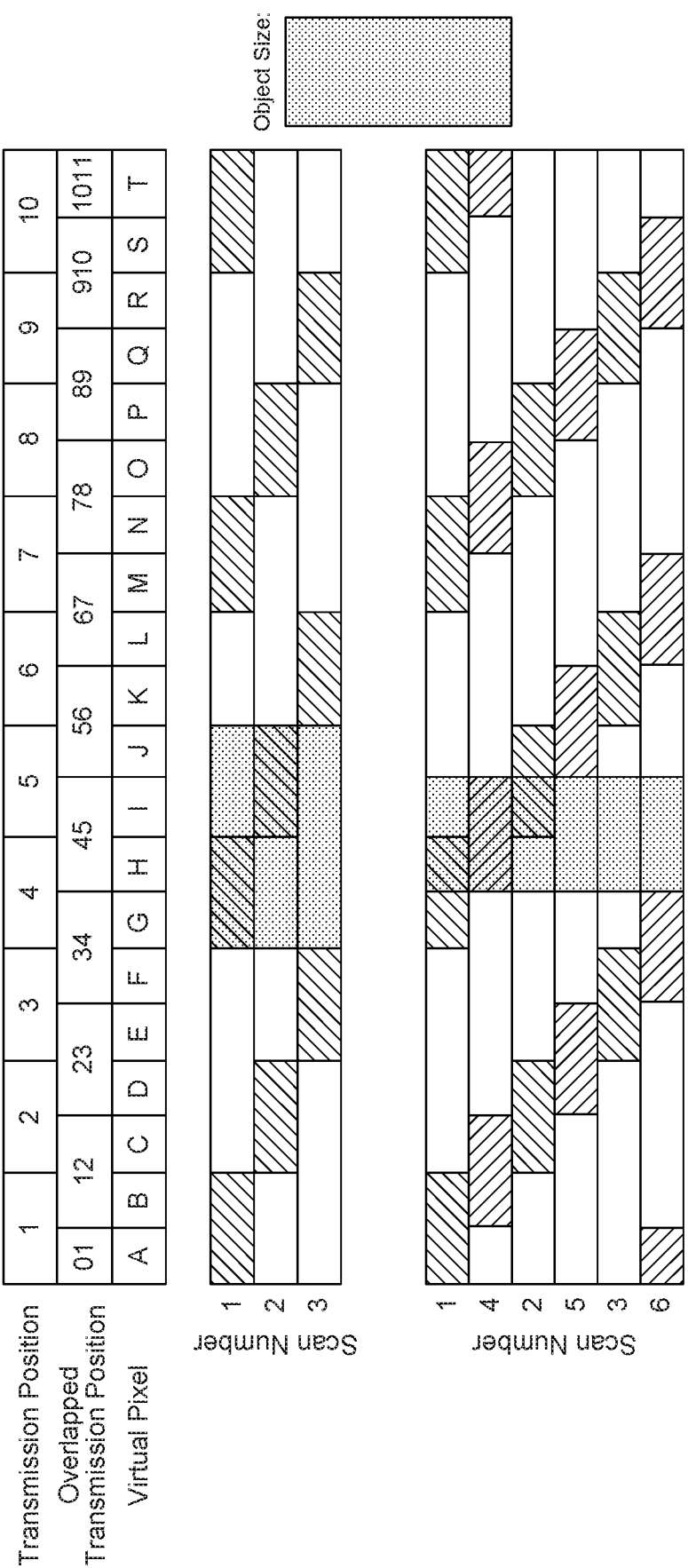
FIG. 3A shows a scanning sequence for horizontal scanning according to a discrete number of transmission positions according to one or more embodiments.
Figure 3B:
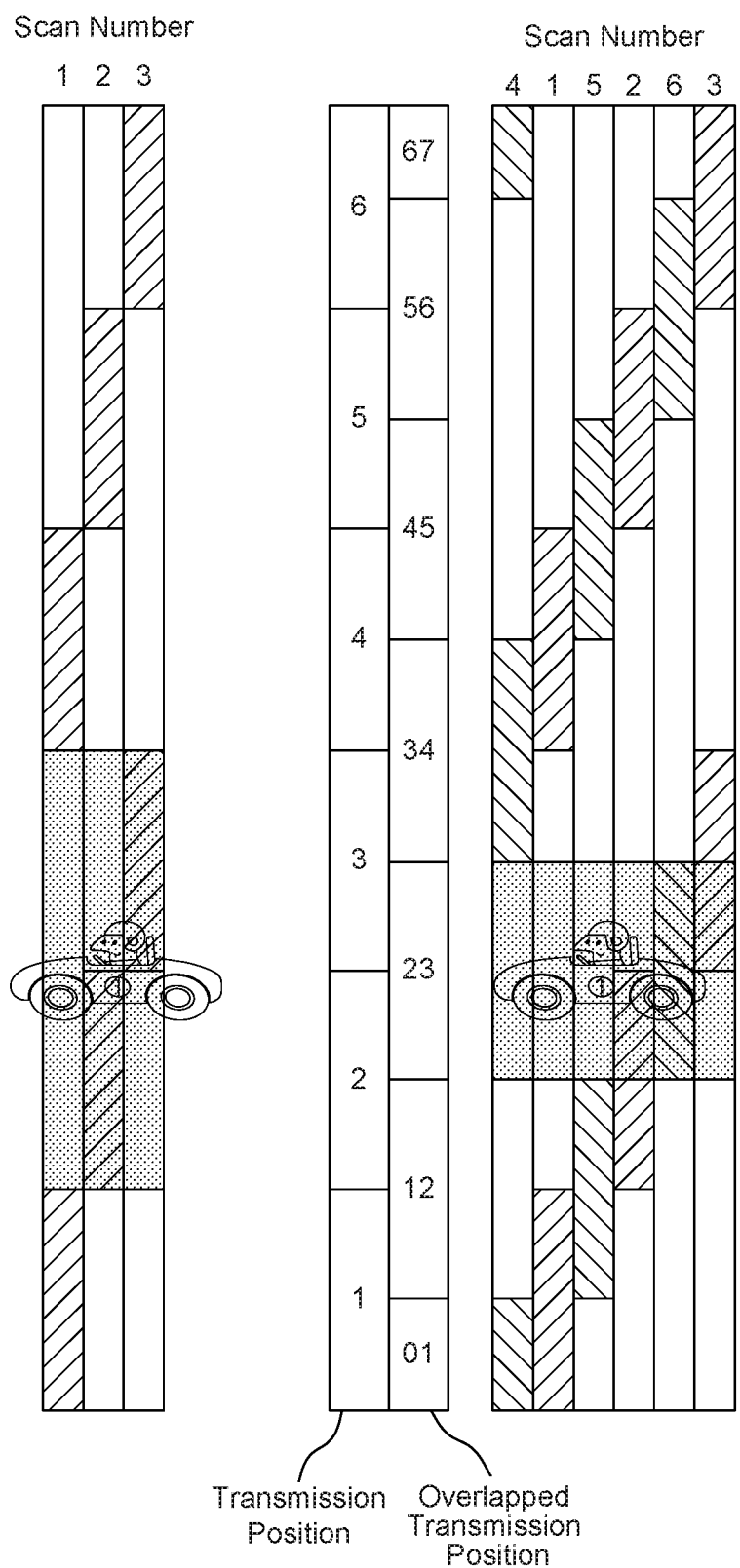
FIG. 3B shows a scanning sequence for vertical scanning according to a discrete number of transmission positions according to one or more embodiments.

FIG. 3A shows a scanning sequence for horizontal scanning according to a discrete number of transmission positions according to one or more embodiments. FIG. 3B shows a scanning sequence for vertical scanning according to a discrete number of transmission positions according to one or more embodiments. FIG. 3A corresponds to a scanning technique implemented by the scanning system 100a depicted in FIG. 1A, whereas FIG. 3B corresponds to a scanning technique implemented by the scanning system 100b depicted in FIG. 1B.

In particular, a top portion of FIG. 3A shows a first scanning sequence of three consecutive scans 1, 2, and 3 in which nonoverlapped scanning is performed. The three consecutive scans 1, 2, and 3 may be performed in sequential order from 1 to 2 to 3. However, the sequential order of scans is not limited to a specific order.

A bottom portion of FIG. 3A shows a second scanning sequence of six consecutive scans 1-6 in which overlapped scanning is performed. The six consecutive scans 1-6 may be performed in sequential order from 1 to 2 to 3 to 4 to 5 to 6, or from 1 to 4 to 2 to 5 to 3 to 6. However, the sequential order of scans is not limited to a specific order. As demonstrated, an overlapped scanning pattern is used during overlapped scanning.

Each scan includes the rotation of the MEMS mirror 12 one-half a scanning period (i.e., one-half an oscillation period). Thus, during a single scan, the MEMS mirror 12 rotates from one extrema position to the opposite extrema position. During each scan, the illumination unit 10 may fire laser beams at a set transmission interval. Thus, the transmission positions in each scan are equally spaced apart, as shown, according to the transmission interval.

FIG. 3A illustrates a discrete number of transmission positions 1-10 in a grid pattern. Each of the transmission positions 1-10 are representative of a discrete mirror position of the MEMS mirror 12, at which the MEMS mirror 12 is positioned when the illumination unit 10 is triggered for firing a laser beam. Thus, the center of each transmission position 1-10 represents a transmission direction of the fired laser beam. Thus, during scan number 1, laser beams are transmitted at transmission positions 1, 4, 7, and 10.

Similarly, FIG. 3A illustrates a discrete number of overlapped transmission positions 01, 12, 23, 34, 45, 56, 67, 78, 910, and 1011 that each represent transmission positions between two discrete transmission positions 1-10, including additional discrete transmission positions 0 and 11 that are not illustrated.

A width of each laser beam is represented by each shaded block. The width of each laser beam corresponds to an angle region at which the laser beam is projected into the field of view in the horizontal direction. The width of each beam may correspond to the width of one pixel column of the photodetector array 15, which may be a 1D photodetector array or a 2D photodetector array. Thus, each shaded block represents an angle region, one pixel column wide, that corresponds to the transmission position of the MEMS mirror 12.

According to the top portion of FIG. 3A, an angle region of each laser beam does not overlap with other angle regions. This type of scanning may permit a faster frame rate than overlapped scanning.

In contrast, according to the bottom portion of FIG. 3A, each angle region partially overlaps with two other angle regions. In other words, each laser beam partially overlaps with a first laser beam from a first scan and partially overlaps with a laser beam from a second scan. For example, a laser beam that corresponds to transmission position 5 in scan 2 has an angle region that overlaps with laser beams transmitted at overlapped transmission position 45 in scan 4 and at overlapped transmission position 56 in scan 5.

Here, a 50% overlap is used. However, a higher or lower degree of overlap may be selected by the system controller 23. For example, a 75% overlap may be used, which may result in an increase in information accuracy at the expense of a slower frame rate.

In addition, FIG. 3A illustrates a number of virtual pixels A-T which the signal processing circuit of the system controller 23 uses as a reference point to determine an object size. For example, pixels of the photodetector array 15 corresponding to transmission positions 4, 45, and 5 may detect reflected beams, indicating an object is present at those positions. In particular, a pixels corresponding to transmission positions 4 and 5 have detected an object with a TOF difference less than a defined margin, indicating a same object.

On the other hand, pixels of the photodetector array 15 corresponding to transmission positions 34 and 56 may not detect reflected beams, indicating that no objects are present at those positions. Thus, the signal processing circuit may determine that an object is located at virtual pixels H and I, but not at virtual pixels G and J. Thus, the object size can be more precisely determined in comparison to the top portion of FIG. 3A that does not use an overlapped scanning pattern and cannot distinguish object boundaries with the specificity that overlapped sampling can achieve. As a consequence, a sharper image may be obtained with overlapped sampling.

As a further benefit to overlapped sampling, one object may be present in close-to-mid distance from the LIDAR sensor, with an object size of one pixel but located in the middle of two transmission positions. As demonstrated in FIG. 3A, overlapped scanning provides increased information accuracy about the object size since two pairs of neighbouring transmission positions hit an object as opposed to only 1 pair.

In another case, an object may be located at a far distance from the LIDAR sensor. The overlapped scanning technique provides an increased level of reflected signal detection due to the improved coverage by the overlapped angle regions. Therefore, the probability of object detection is increased.

Figure 4:
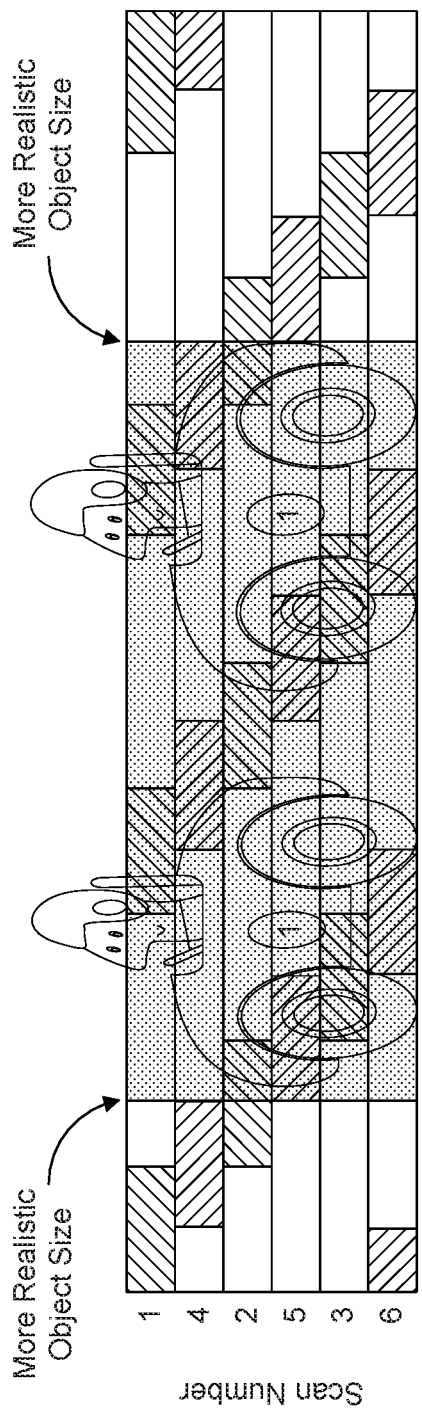
FIG. 4 illustrates a situation in which two objects are located half a beam width away from each other according to one or more embodiments.

In another case, two objects may be located half a beam width away from each other. While the two objects may not be distinguishable from each other, the edges of the "object size" information will be more accurate using the overlapped scanning technique. For example, FIG. 4 illustrates a situation in which two objects are located half a beam width away from each other. In other words, a beam fired at transmission position 5 may "hit" both objects. Even if the two objects may not be distinguishable from each other, the outer edges at virtual pixels D and O may be sharper and better defined.

With regard to the vertical scanning depicted in FIG. 3B, a similar concept as described in conjunction with FIG. 3A is illustrated. In particular, a left portion of FIG. 3B shows a first scanning sequence of three consecutive scans 1, 2, and 3 in which nonoverlapped scanning is performed. The three consecutive scans 1, 2, and 3 may be performed in sequential order from 1 to 2 to 3. However, the sequential order of scans is not limited to a specific order.

A right portion of FIG. 3B shows a second scanning sequence of six consecutive scans 1-6 in which overlapped scanning is performed. The six consecutive scans 1-6 may be performed in sequential order from 1 to 2 to 3 to 4 to 5 to 6, or from 4 to 1 to 5 to 2 to 6 to 3. However, the sequential order of scans is not limited to a specific order. As demonstrated, an overlapped scanning pattern is used during overlapped scanning.

Each scan includes the rotation of the MEMS mirror 12 one-half a scanning period (i.e., one-half an oscillation period). Thus, during a single scan, the MEMS mirror 12 rotates from one extrema position to the opposite extrema position. During each scan, the illumination unit 10 may fire laser beams at a set transmission interval. Thus, the transmission positions in each scan are equally spaced apart, as shown, according to the transmission interval.

FIG. 3B illustrates a discrete number of transmission positions 1-6 in a grid pattern. Each of the transmission positions 1-6 is representative of a discrete mirror position of the MEMS mirror 12, at which the MEMS mirror 12 is positioned when the illumination unit 10 is triggered for firing a laser beam. Thus, the center of each transmission position 1-10 represents a transmission direction of the fired laser beam. Thus, during scan number 1, laser beams are transmitted at transmission positions 1 and 4.

Similarly, FIG. 3B illustrates a discrete number of overlapped transmission positions 01, 12, 23, 34, 45, 56, and 67 that each represent transmission positions between two transmission positions 1-6, including additional transmission positions 0 and 7 that are not illustrated.

A width of each laser beam is represented by each shaded block. The width of each laser beam corresponds to an angle region at which the laser beam is projected into the field of view in the vertical direction. The width of each beam may correspond to the width of one pixel row of the photodetector array 15, which may be a 1D photodetector array or a 2D photodetector array. Thus, each shaded block represents an angle region, one pixel row wide, that corresponds to the transmission position of the MEMS mirror 12.

Figure 5:
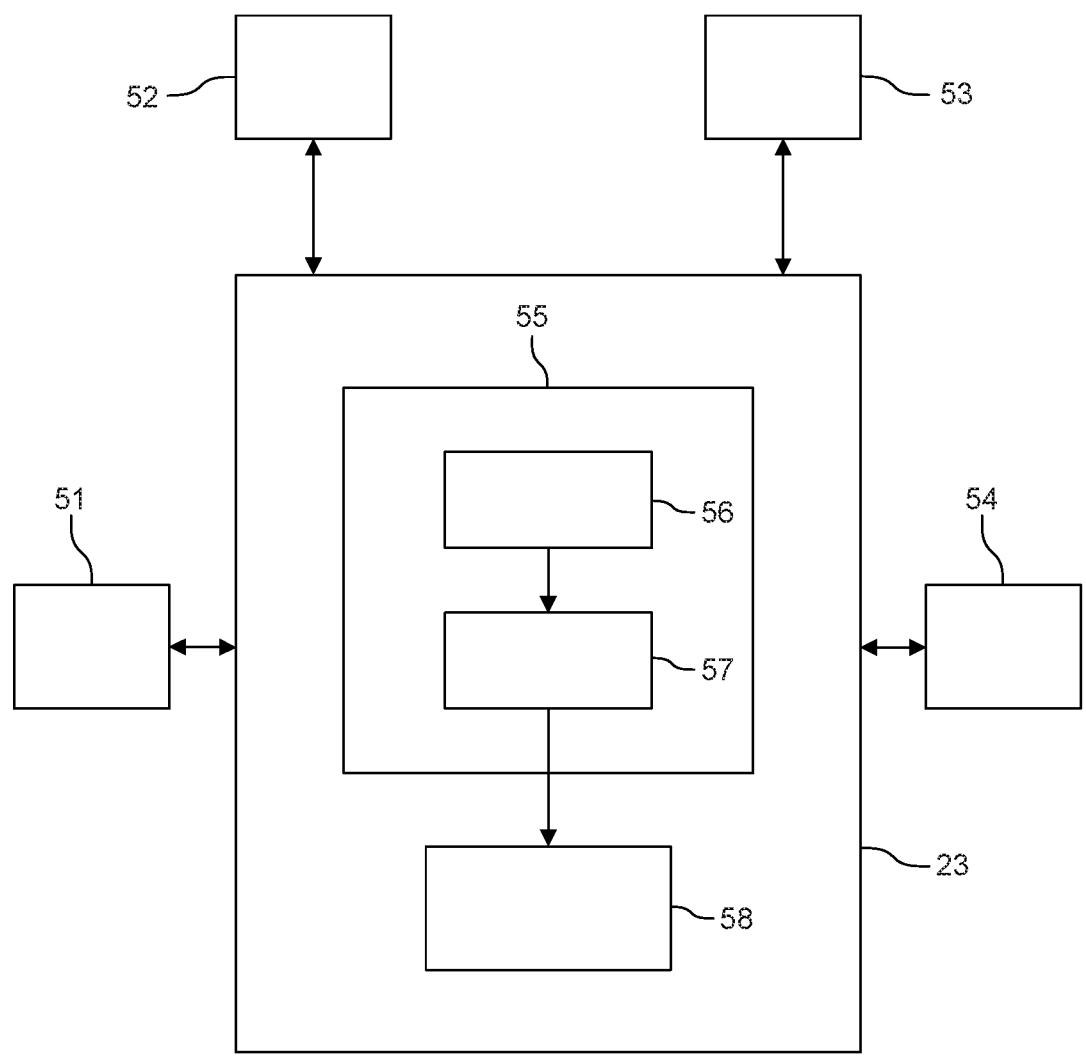
FIG. 5 is a block diagram of a object scanning system according to one or more embodiments.

FIG. 5 is a block diagram of a object scanning system 500 according to one or more embodiments. In particular, the object scanning system 500 includes the system controller 23 and various sensors electrically coupled thereto. The various sensors include a LIDAR sensor 51, a radar sensor 52, a camera sensor 53, and an object sensor 54. The LIDAR sensor 51 may be the LIDAR scanning system 200 shown in FIG. 2. The object sensor 54 may be any type of object sensor 54 capable of detecting an object and generating sensor data based on the detection.

The system controller 23 includes a signal processing circuit 56 that receives sensor data from one or more of the various sensors 51-54. The signal processing circuit 56 includes a object detector circuit 55 that detects objects based on the sensor data received from the one or more of the various sensors 51-54. The signal processing circuit 56 also includes an object position determination circuit 57 that determines a position of a detected object, as well as a transmission direction that corresponds to the position of the detected object.

The system controller 23 further includes a control circuit 58 (e.g., a microprocessor) that receives the position information and/or transmission direction information from the object position determination unit 57, and controls a LIDAR transmitter of the LIDAR sensor 55 to carry out overlapped scanning based on the received information.

For example, the control circuit 58 may control the illumination unit 10 to perform overlapped scanning always, similar to the bottom portion of FIG. 3A, regardless of whether an object is detected.

Alternatively, the control circuit 58 may control the illumination unit 10 to perform overlapped scanning only in response to an object being detected. In this case, the control circuit 58 may implement full overlapped scans of the field of view, such as scans 4, 5, and 6 shown in the bottom portion of FIG. 3A, in response to an object being detected. Otherwise, in the absence of the detected object, the control circuit 58 implements non-overlapped scanning according to the top portion of FIG. 3A (i.e., using scans 1, 2, and 3 only). For example, non-overlapped scans 1, 2, and 3 may be initially performed in sequence for initially detecting an object, and, if any object is detected in the initial set of non-overlapped scans, overlapped scans 4, 5, and 6 may be initiated in a second round of scanning to improve object size and edge detection of the detected object. This effectively keeps the frame rate higher until an object is detected (i.e., until a lower frame rate is needed).

Figure 6:
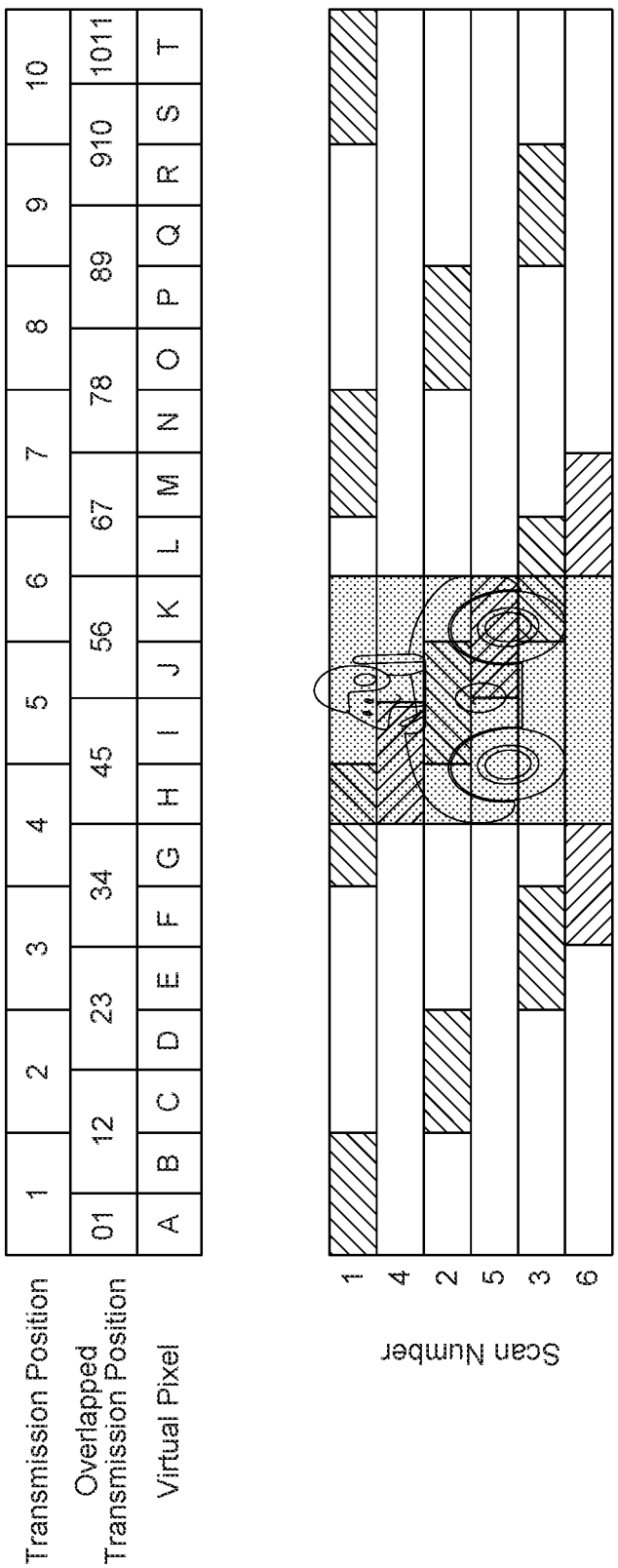
FIG. 6 shows a targeted overlapped scanning sequence in response to a detected object according to one or more embodiments.

Alternatively, the control circuit 58 may implement targeted overlapped scans such that overlapped laser beams are only fired around the already detected object. This case is demonstrated in FIG. 6, which shows a targeted overlapped scanning sequence in response to a detected object according to one or more embodiments. In this example, an object is detected by one or more of the various sensors 51-54 at a position in the field of view that corresponds to transmission positions 4, 5, and 6, which each correspond to respective transmission direction. The transmission positions may be determined by the object position determination circuit 57 based on LIDAR sensor data and/or other sensor data from the other sensors 52-54.

Based on the determined transmission positions 4, 5, and 6 that correspond to the position of the object, the control circuit 58 may select overlapped transmission positions produce a laser beam that has an angle region that overlaps with the laser beams fired at transmission positions 4, 5, and 6. In other words, the control circuit 58 may select overlapped transmission positions that overlap with the determined transmission positions 4, 5, and 6. In this case, overlapped transmission positions 34, 45, 56, and 67 overlap with at least one of the determined transmission positions 4, 5, and 6, and are selected for target overlapped scanning. The control circuit 58 the controls the illumination unit 10 to fire laser beams at the overlapped transmission positions 34, 45, 56, and 67 for further object detection.

Furthermore, if the LIDAR transmitter 21 has not yet scanned the determined transmission positions 4, 5, and 6, the control circuit 58 may controls the illumination unit 10 to fire laser beams at the determined transmission positions 4, 5, and 6 in addition to the overlapped transmission positions 34, 45, 56, and 67. This case may arise if the object is detected based on sensor data provided by a sensor that is different from the LIDAR sensor 51.

Thus, according to targeted overlapped scanning, overlapped transmission positions and beam transmission directions are selected based on a detected object to more accurately detect the edges and boundaries of the detected object. In addition, by firing the overlapped beams only around already detected objects, the frame rate of the LIDAR sensor 51 can be improved in comparison to performing full overlapped scans.

Thus, the LIDAR system includes a light detector module configured to receive at least one reflected beam from at least one object based on a first plurality of laser beams, and generate electrical signals based on the at least one received reflected beam; and a signal processing circuit configured to detect the at least one object based on the electrical signals. The controller is configured to initiate a second scan of a second plurality of laser beams in response to the signal processing circuit detecting the at least one object, where each of the second plurality of laser beams overlaps with at least one of the a first plurality of laser beams.

More generally, the LIDAR system includes a signal processing circuit configured to detect at least one object (i.e., based on sensor data received from one or more various sensors), and the controller is configured to initiate an overlapped scan in response to detecting the at least one object.

According to one or more embodiments, an object scanning system is provided. The object scanning system includes an object sensor configured to detect a position of an object; a LIDAR transmitter configured to scan a field of view with laser beams, wherein each laser beam has a beam width that, when projected into the field of view, coincides with an angle region of the field of view in a vertical or a horizontal direction; and a controller configured to determine a transmission direction that coincides with the detected position of the object, control the LIDAR transmitter to transmit a first laser beam at the transmission direction such that a first angle region covered by the first laser beam coincides with the detected position of the object, and control the LIDAR transmitter to transmit a second laser beam at a first further transmission direction such that a second angle region covered by the second laser beam overlaps with a first portion of the first angle region.

The controller may be configured to control the LIDAR transmitter to transmit a third laser beam at a second further transmission direction such that a third angle region covered by the third laser beam overlaps with a second portion of the first angle region that is different from the first portion.

The object sensor may be a radar sensor, a LIDAR sensor, or a camera sensor.

According to one or more embodiments, another object scanning system is provided. The object scanning system includes an object sensor configured to detect a position of an object; a LIDAR transmitter configured to scan a field of view with laser beams, wherein each laser beam has a beam width that, when projected into the field of view, coincides with an angle region of the field of view in a vertical or a horizontal direction; and a controller configured to: determine a transmission direction that coincides with the detected position of the object, based on the determined transmission direction, control the LIDAR transmitter to transmit a first laser beam such that a first angle region covered by the first laser beam coincides with the detected position of the object, and based on the determined transmission direction, control the LIDAR transmitter to transmit a second laser beam such that a second angle region covered by the second laser beam partially overlaps with the first angle region. The first laser beam may be transmitted at the determined transmission direction that coincides with the detected position of the object.

The object sensor may be a radar sensor, a LIDAR sensor, or a camera sensor.

Although embodiments described herein relate to a MEMS device with a mirror, it is to be understood that other implementations may include optical devices other than MEMS mirror devices. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) system, comprising:
    a LIDAR transmitter configured to scan a field of view with laser beams, wherein each laser beam has a beam width that, when projected into the field of view, coincides with an angle region of the field of view in a horizontal direction; and
    a controller configured to initiate a plurality of scans of the field of the view with the LIDAR transmitter using an overlapped scanning technique, wherein the LIDAR transmitter is configured to transmit a first plurality of laser beams according to a first transmission interval in a first scan that moves horizontally across the field of view,
    wherein a first plurality of angle regions covered by the first plurality of laser beams are mutually exclusive of each other, wherein the LIDAR transmitter is configured to transmit a second plurality of laser beams according to a second transmission interval in a second scan that moves horizontally across the field of view, wherein a second plurality of angle regions covered by the second plurality of laser beams are mutually exclusive of each other, and
    wherein each of the second plurality of angle regions partially overlaps with, but not fully overlaps with, a different corresponding one of the first plurality of angle regions by a first predetermined amount.

2. The LIDAR system of claim 1, wherein the first scan and the second scan are two consecutive scans that move horizontally across the field of view in opposite directions.

3. The LIDAR system of claim 1, wherein the first scan and the second scan are two nonconsecutive scans that move horizontally across the field of view in a same direction or in opposite directions.

4. The LIDAR system of claim 1, wherein the first predetermined amount is variable and the controller is configured to regulate the first predetermined amount.

5. The LIDAR system of claim 1, wherein:
    the LIDAR transmitter is configured to transmit a third plurality of laser beams according to a third transmission interval in a third scan that moves horizontally across the field of view, wherein a third plurality of angle regions covered by the third plurality of laser beams are mutually exclusive of each other, and
    each of the third plurality of angle regions partially overlaps with, but not fully overlaps with, a corresponding one of the first plurality of angle regions by the first predetermined amount.

6. The LIDAR system of claim 5, wherein each of the third plurality of angle regions partially overlaps with, but not fully overlaps with, a corresponding one of the second plurality of angle regions by a second predetermined amount that is different than the first predetermined amount.

7. The LIDAR system of claim 5, wherein:
    the second scan and the third scan are two consecutive scans that move horizontally across the field of view in opposite directions, and one of the second scan or the third scan is consecutive to the first scan, or
    the first scan, the second scan, and the third scan are three consecutive scans.

8. The LIDAR system of claim 1, wherein:
    the LIDAR transmitter includes a one-dimensional scanning mirror configured to oscillate about a single scanning axis such that the laser beams are projected as a vertical scanning line into the field of view that moves horizontally across the field of view as the one-dimensional scanning mirror oscillates about the single scanning axis, wherein the vertical scanning line extends fully across the field of view in a vertical dimension.

9. The LIDAR system of claim 1, wherein:
    the LIDAR transmitter is configured to transmit the first plurality of laser beams at a first plurality of transmission directions, and
    the LIDAR transmitter is configured to transmit the second plurality of laser beams at a second plurality of transmission directions different from the first plurality of transmission directions.

10. The LIDAR system of claim 1, further comprising:
    a light detector module configured to receive at least one reflected beam from at least one object based on the first plurality of laser beams, and generate electrical signals based on the at least one received reflected beam; and
    a signal processing circuit configured to detect the at least one object based on the electrical signals, wherein the controller is configured to initiate the second scan in response to the signal processing circuit detecting the at least one object.

11. The LIDAR system of claim 1, further comprising:
a signal processing circuit configured to detect at least one object,
wherein the controller is configured to initiate the second scan in response to detecting the at least one object.

12. The LIDAR system of claim 1, wherein the beam width of each laser beam fully occupies the angle region of the field of view throughout a lengthwise extension of the laser beam.

13. A Light Detection and Ranging (LIDAR) system, comprising:
a LIDAR transmitter configured to scan a field of view with laser beams, wherein each laser beam has a beam width that, when projected into the field of view, coincides with an angle region of the field of view in a horizontal direction,
a controller configured to control the LIDAR transmitter to scan the field of the view using an overlapped scanning technique,
wherein the LIDAR transmitter is configured to transmit a first plurality of laser beams in a first scan that moves horizontally across the field of view, the first plurality of laser beams being transmitted at a first plurality of transmission directions such that a first plurality of angle regions covered by the first plurality of laser beams are mutually exclusive of each other; and
a signal processing circuit configured to detect at least one object based on the first plurality of laser beams, and identify an object transmission direction from the first plurality of transmission directions that corresponds to a position of the at least one object, wherein the object transmission direction further corresponds to a target angle region of the first plurality of angle regions,
wherein the LIDAR transmitter is configured to transmit a first overlapped laser beam that partially overlaps with, but not fully overlaps with, the target angle region.

14. The LIDAR system of claim 13, wherein the LIDAR transmitter is configured to transmit a second overlapped laser beam that partially overlaps with, but not fully overlaps with, the target angle region.

15. The LIDAR system of claim 14, wherein an angle region covered by the first overlapped laser beam partially overlaps with, but not fully overlaps with, an angle region covered by the second overlapped laser beam.

16. The LIDAR system of claim 14, wherein an angle region covered by the first overlapped laser beam and an angle region covered by the second overlapped laser beam are mutually exclusive of each other.

17. A method of scanning a field of view implemented by a Light Detection and Ranging (LIDAR) system, the method comprising:
scanning a field of view with laser beams, wherein each laser beam has a beam width that, when projected into the field of view, coincides with an angle region of the field of view in a horizontal direction,
the scanning comprising:
transmitting a first plurality of laser beams according to a first transmission interval in a first scan that moves horizontally across the field of view, wherein a first plurality of angle regions covered by the first plurality of laser beams are mutually exclusive of each other; and
transmitting a second plurality of laser beams according to a second transmission interval in a second scan that moves horizontally across the field of view, wherein a second plurality of angle regions covered by the second plurality of laser beams are mutually exclusive of each other,
wherein each of the second plurality of angle regions partially overlaps with, but not fully overlaps with, a different corresponding one of the first plurality of angle regions by a first predetermined amount.

18. The method of claim 17, wherein the scanning further comprises:
transmitting a third plurality of laser beams according to a third transmission interval in a third scan that moves horizontally across the field of view, wherein a third plurality of angle regions covered by the third plurality of laser beams are mutually exclusive of each other, and
each of the third plurality of angle regions partially overlaps with, but not fully overlaps with, a corresponding one of the first plurality of angle regions by the first predetermined amount.

19. The method of claim 18, wherein each of the third plurality of angle regions partially overlaps with, but not fully overlaps with, a corresponding one of the second plurality of angle regions by a second predetermined amount different than the first predetermined amount.

20. The method of claim 17, further comprising:
receiving at least one reflected beam from at least one object based on the first plurality of laser beams;
generating electrical signals based on the at least one received reflected beam;
detecting the at least one object based on the electrical signals; and
initiating the second scan in response to detecting the at least one object.

21. The method of claim 17, further comprising:
detecting at least one object; and
initiating the second scan in response to detecting the at least one object.

* * * * *